United States Patent
Bian et al.

(10) Patent No.: US 10,469,002 B2
(45) Date of Patent: Nov. 5, 2019

(54) ELECTRICALLY COMMUTATED MOTOR AND FREEZER COMPRISING THE SAME

(71) Applicant: Zhongshan Broad-Ocean Motor Co., Ltd., Zhongshan (CN)

(72) Inventors: Wenqing Bian, Zhongshan (CN); Ge Hu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 438 days.

(21) Appl. No.: 15/334,264

(22) Filed: Oct. 25, 2016

(65) Prior Publication Data

US 2017/0047873 A1     Feb. 16, 2017

Related U.S. Application Data

(63) Continuation-in-part of application No. PCT/CN2015/071486, filed on Jan. 23, 2015.

(30) Foreign Application Priority Data

Dec. 13, 2014   (CN) .......................... 2014 1 0771652

(51) Int. Cl.
    *F25B 49/02*     (2006.01)
    *H02P 6/14*      (2016.01)
    (Continued)

(52) U.S. Cl.
    CPC ............... *H02P 6/14* (2013.01); *F25D 17/06* (2013.01); *F25D 17/067* (2013.01); *F25D 29/00* (2013.01);
    (Continued)

(58) Field of Classification Search
    CPC ............ H01L 21/0495; H01L 29/0619; H01L 29/1608; H01L 29/41766; H01L 29/41775;
    (Continued)

(56) References Cited

U.S. PATENT DOCUMENTS 5,689,963 A    11/1997   Bahel et al.
7,716,937 B2    5/2010   Schenk et al.
(Continued)

FOREIGN PATENT DOCUMENTS

CN    2063720 U    10/1990
CN    2417438 Y     1/2001
(Continued)

*Primary Examiner* — Muhammad S Islam
(74) *Attorney, Agent, or Firm* — Matthias Scholl P.C.; Matthias Scholl

(57) ABSTRACT

An ECM motor, including: a motor controller and a motor body. A microprocessor of the motor controller is connected to a first temperature detecting unit and a second temperature detecting unit disposed at different positions outside the ECM motor for detecting temperatures at the different positions. In operation, when the temperature difference between the first temperature T1 and the second temperature T2 is smaller than or equal to a preset value T0, a first gear at the rotational speed S1 is selected by the microprocessor and the motor is controlled to run constantly in the first gear at the rotational speed S1. When the temperature difference between the first temperature T1 and the second temperature T2 is larger than the preset value T0, a second rotational speed S2 is selected by the microprocessor and the motor is controlled to run constantly in the second gear at the rotational speed S2.

15 Claims, 8 Drawing Sheets

(51) Int. Cl.
*H02K 11/20* (2016.01)
*H02K 11/25* (2016.01)
*H02K 11/33* (2016.01)
*H02P 29/60* (2016.01)
*F25D 17/06* (2006.01)
*F25D 29/00* (2006.01)
*H02K 1/27* (2006.01)
*H02P 6/08* (2016.01)

(52) U.S. Cl.
CPC ........... *F25D 29/005* (2013.01); *H02K 1/276* (2013.01); *H02K 1/278* (2013.01); *H02K 11/20* (2016.01); *H02K 11/25* (2016.01); *H02K 11/33* (2016.01); *H02P 6/08* (2013.01); *H02P 29/60* (2016.02); *F25B 2600/112* (2013.01); *F25B 2700/21172* (2013.01); *F25B 2700/21173* (2013.01); *F25D 2317/0681* (2013.01); *F25D 2700/12* (2013.01); *F25D 2700/122* (2013.01); *F25D 2700/14* (2013.01)

(58) Field of Classification Search
CPC ..... H01L 29/47; H01L 29/495; H01L 29/517; H01L 29/66068; H01L 29/66477; H01L 29/665; H01L 29/7395; H01L 29/78; H01L 29/7802; H01L 29/7811; H01L 29/7813; H01L 29/782; H01L 29/7839; H01L 29/872
See application file for complete search history.

(56) References Cited

U.S. PATENT DOCUMENTS

| | | | | |
|---|---|---|---|---|
| 2001/0054293 | A1* | 12/2001 | Gustafson | F25B 49/02 62/183 |
| 2004/0124796 | A1* | 7/2004 | Bailey | H02K 1/141 318/400.4 |
| 2005/0123423 | A1* | 6/2005 | Weisser | F04D 29/083 417/423.7 |
| 2007/0012055 | A1* | 1/2007 | Schenk | F25B 49/025 62/208 |
| 2014/0328705 | A1 | 11/2014 | Lu et al. | |

FOREIGN PATENT DOCUMENTS

| | | |
|---|---|---|
| CN | 202833210 U | 3/2013 |
| CN | 103546077 A | 1/2014 |
| CN | 203554199 U | 4/2014 |
| EP | 0829727 A2 | 3/1998 |
| JP | 10288408 A | 10/1998 |
| JP | 2008-84173 A | 4/2008 |

* cited by examiner

ELECTRICALLY COMMUTATED MOTOR AND FREEZER COMPRISING THE SAME

CROSS-REFERENCE TO RELATED APPLICATIONS

This application is a continuation-in-part of International Patent Application No. PCT/CN2015/071486 with an international filing date of Jan. 23, 2015, designating the United States, now pending, and further claims priority benefits to Chinese Patent Application No. 201410771652.5 filed Dec. 13, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to an electrically commutated motor (ECM) which automatically regulates its own rotational speed and a freezer comprising the same.

Description of the Related Art

Typically, the ECM motor in a freezer is controlled by a motor controller to output high or low rotational speed. However, the motor controller has high cost, a large number of components, and the installation thereof is troublesome and complex.

SUMMARY OF THE INVENTION

In view of the above-described problems, it is one objective of the invention to provide an ECM motor capable of automatically regulating a rotational speed without the control of a specialized controller. The ECM motor has simple structure, small components, and is convenient for installation.

It is another objective of the invention to provide a freezer. The freezer does not require the specialized controller to send a command to control the ECM motor to operate at a high gear or a low gear at the rotational speed but employs two temperature detecting units to directly produce a control command to select the rotational speed. The freezer has simple structure, small components, low production cost, and convenient installation.

To achieve the above objective, in accordance with one embodiment of the invention, there is provided an ECM motor capable of automatically regulating a rotational speed. The ECM motor comprises: a motor controller and a motor body. The motor body comprises: a stator assembly, a rotor assembly, and a housing assembly. The stator assembly and the rotor assembly are mounted inside the housing assembly. The stator assembly comprises a stator core and coil windings wound on the stator core. The rotor assembly comprises a rotor core and permanent magnets embedded in the rotor core. The motor controller comprises a control circuit board where a microprocessor, an insulated gate bipolar transistor (IGBT) module, and an operation parameter detecting unit are arranged. The operation parameter detecting unit is configured to input operation data of the motor to the microprocessor. An output terminal of the microprocessor is connected to an input terminal of the IGBT module, and an output terminal of the IGBT module is connected to the coil windings wound on the stator core. The microprocessor of the motor controller is further connected to a first temperature detecting unit and a second temperature detecting unit. The first temperature detecting unit and the second temperature detecting unit are respectively disposed at different positions outside the ECM motor for detecting a first temperature T1 and a second temperature T2 of different positions. In operation, when a temperature difference between the first temperature T1 and the second temperature T2 is smaller than or equal to a preset value T0, a first gear at the rotational speed S1 is selected by the microprocessor and the motor is controlled to run constantly in the first gear at the rotational speed S1. When the temperature difference between the first temperature T1 and the second temperature T2 is larger than the preset value T0, a second rotational speed S2 is selected by the microprocessor and the motor is controlled to run constantly in the second gear at the rotational speed S2.

In accordance with another embodiment of the invention, there is provided a freezer using the ECM motor capable of automatically regulating the rotational speed. The freezer comprises: a compressor, a coil evaporator, and an evaporator fan. The evaporator fan comprises: a fan housing, an ECM motor, and a plurality of fan blades. The compressor supplying a cooling medium to the coil evaporator. The coil evaporator is mounted at one side of the fan housing where an air inlet is arranged. An air outlet is arranged on the other side of the fan housing. The ECM motor is disposed inside the fan housing. The fan blades are installed on an output shaft of the ECM motor. The ECM motor and the fan blades are disposed between the coil evaporator and the air outlet. The ECM motor comprises: a motor controller and a motor body. The motor body comprises: a stator assembly, a rotor assembly, and a housing assembly. The stator assembly and the rotor assembly are mounted inside the housing assembly. The stator assembly comprises a stator core and coil windings wound on the stator core. The rotor assembly comprises a rotor core and permanent magnets embedded in the rotor core. The motor controller comprises a control circuit board where a microprocessor, an IGBT module, and an operation parameter detecting unit are arranged. The operation parameter detecting unit inputting operation data of the motor to the microprocessor. An output terminal of the microprocessor is connected to an input terminal of the IGBT module, and an output terminal of the IGBT module is connected to the coil windings wound on the stator core. The microprocessor of the motor controller is further connected to a first temperature detecting unit and a second temperature detecting unit. The first temperature detecting unit and the second temperature detecting unit are respectively disposed outside the ECM motor. The first temperature detecting unit is disposed in the vicinity of the air inlet of the fan housing for detecting a first temperature T1 of air. The second temperature detecting unit is disposed in the vicinity of the air outlet of the fan housing for detecting a second temperature T2 of the air. In operation, when a temperature difference between the first temperature T1 and the second temperature T2 is smaller than or equal to a preset value T0, a first gear at the rotational speed S1 is selected by the microprocessor and the motor is controlled to run constantly in the first gear at the rotational speed S1. When the temperature difference between the first temperature T1 and the second temperature T2 is larger than the preset value T0, a second rotational speed S2 is selected by the microprocessor and the motor is controlled to run constantly in the second gear at the rotational speed S2. The second gear at the rotational speed S2 is larger than a first gear at the rotational speed S1.

When the ECM motor initially starts under the control of the microprocessor, the motor is controlled to run constantly in the second gear at the rotational speed S2.

The first gear at the rotational speed S1 is 800 rpm, and the second gear at the rotational speed S2 is 1550 rpm.

The preset value T0 ranges at between 1 and 50° C.

A control box is installed in a middle part of the fan housing. The motor controller of the ECM motor is in electric connection with the control box.

The first temperature detecting unit and the second temperature detecting unit are both thermocouples.

A filter screen is arranged at the air outlet of the fan housing, and the second temperature detecting unit is disposed outside the filter screen.

The control box is input with an alternating current power at a voltage of 115 V or 230 V.

Compared with the prior arts, the ECM motor of the invention has the following advantages:

1) A specialized rotational speed controller functions in sending a command of a high gear at the rotational speed or a low gear at the rotational speed to the ECM motor is not required. Two temperature detecting units are adopted to directly produce control command for selecting the rotational speed. The motor has simple structure, small components, low production cost, and convenient installation.

2) In the freezer, the first temperature detecting unit is disposed in the vicinity of the air inlet of the fan housing for detecting a first temperature T1 of hot air. The second temperature detecting unit is disposed in the vicinity of the air outlet of the fan housing for detecting a second temperature T2 of cold air. When the temperature difference between the first temperature T1 and the second temperature T2 is smaller than or equal to a preset value T0, the first gear at the rotational speed S1 is selected by the microprocessor and the motor is controlled to run constantly in the first gear at the rotational speed S1. When the temperature difference between the first temperature T1 and the second temperature T2 is larger than the preset value T0, the second rotational speed S2 is selected by the microprocessor and the motor is controlled to run constantly in the second gear at the rotational speed S2. The control is accurate and reliable and the installation is reasonable.

3) The second gear at the rotational speed S2 is higher than the first gear at the rotational speed S1. When the ECM motor initially starts under the control of the microprocessor, the motor is controlled to run constantly in the second gear at the rotational speed S2, thus being convenient for the application in the freezer and the coordination with the compressor.

4) The first temperature detecting unit and the second temperature detecting unit are both thermocouples, which makes the structure much simpler and the production cost much lower.

DETAILED DESCRIPTION OF THE EMBODIMENTS

For further illustrating the invention, experiments detailing an ECM motor capable of automatically regulating a rotational speed and a freezer comprising the same are described hereinbelow combined with the drawings.

Example 1

Figure 1:
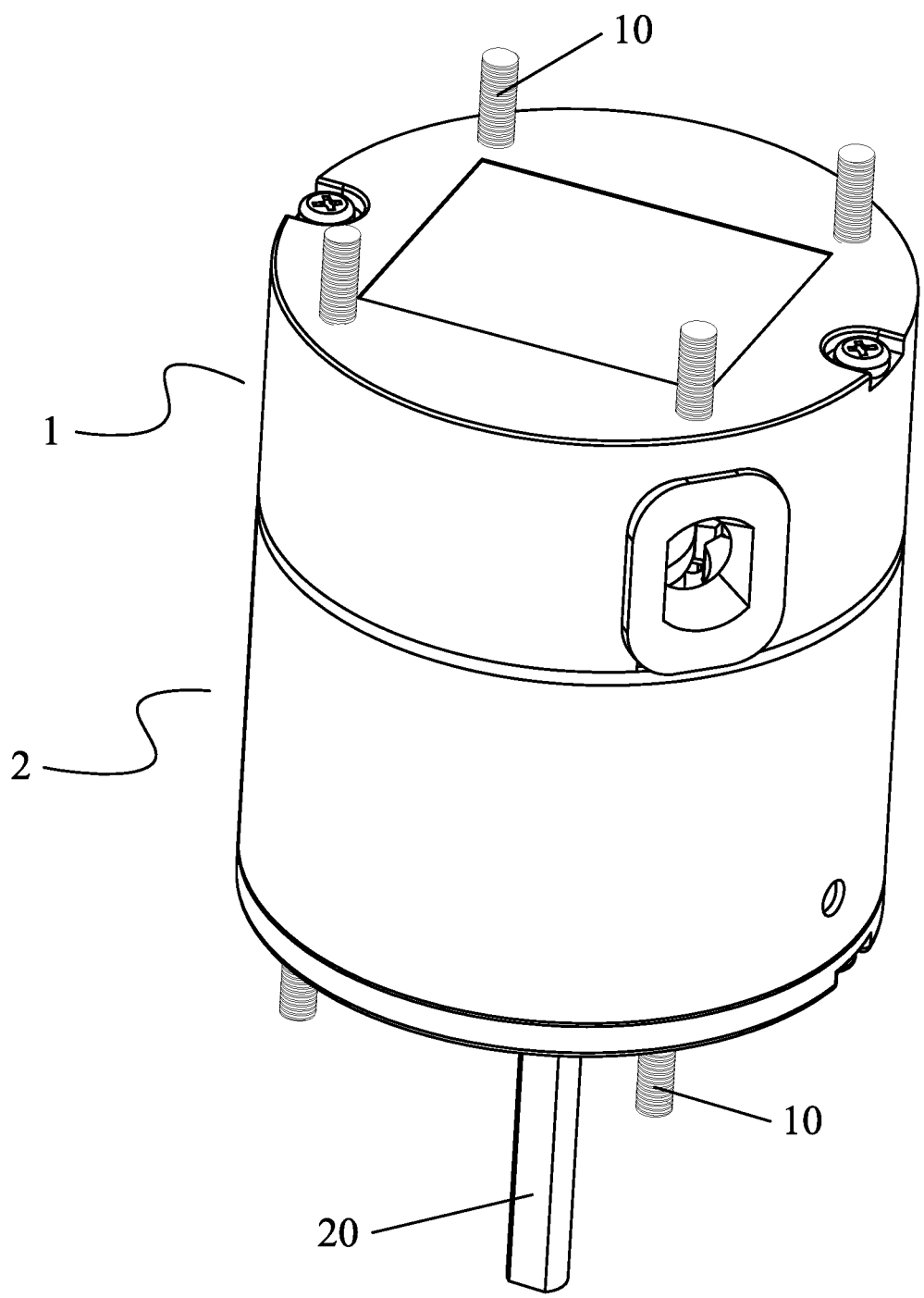
FIG. 1 is a stereogram of an ECM motor in accordance with one embodiment of the invention.
Figure 2:
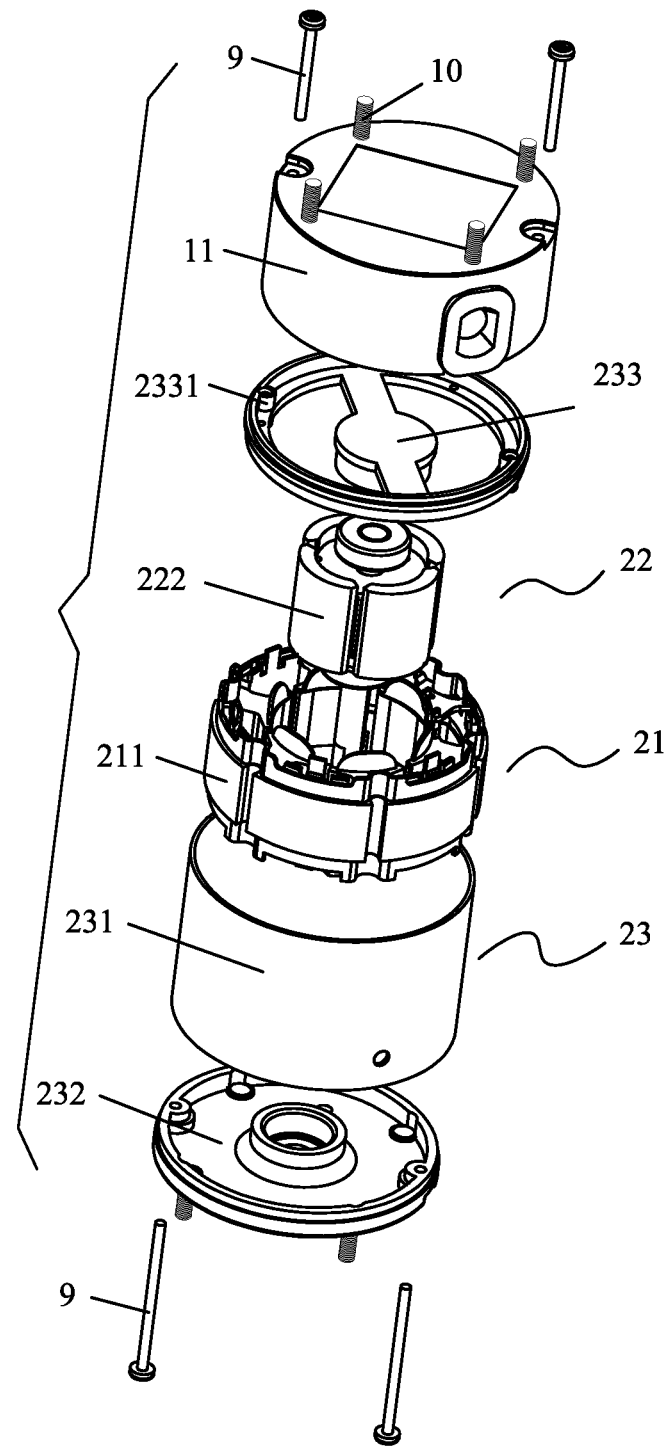
FIG. 2 is an exploded view of an ECM motor in accordance with one embodiment of the invention.
Figure 3:
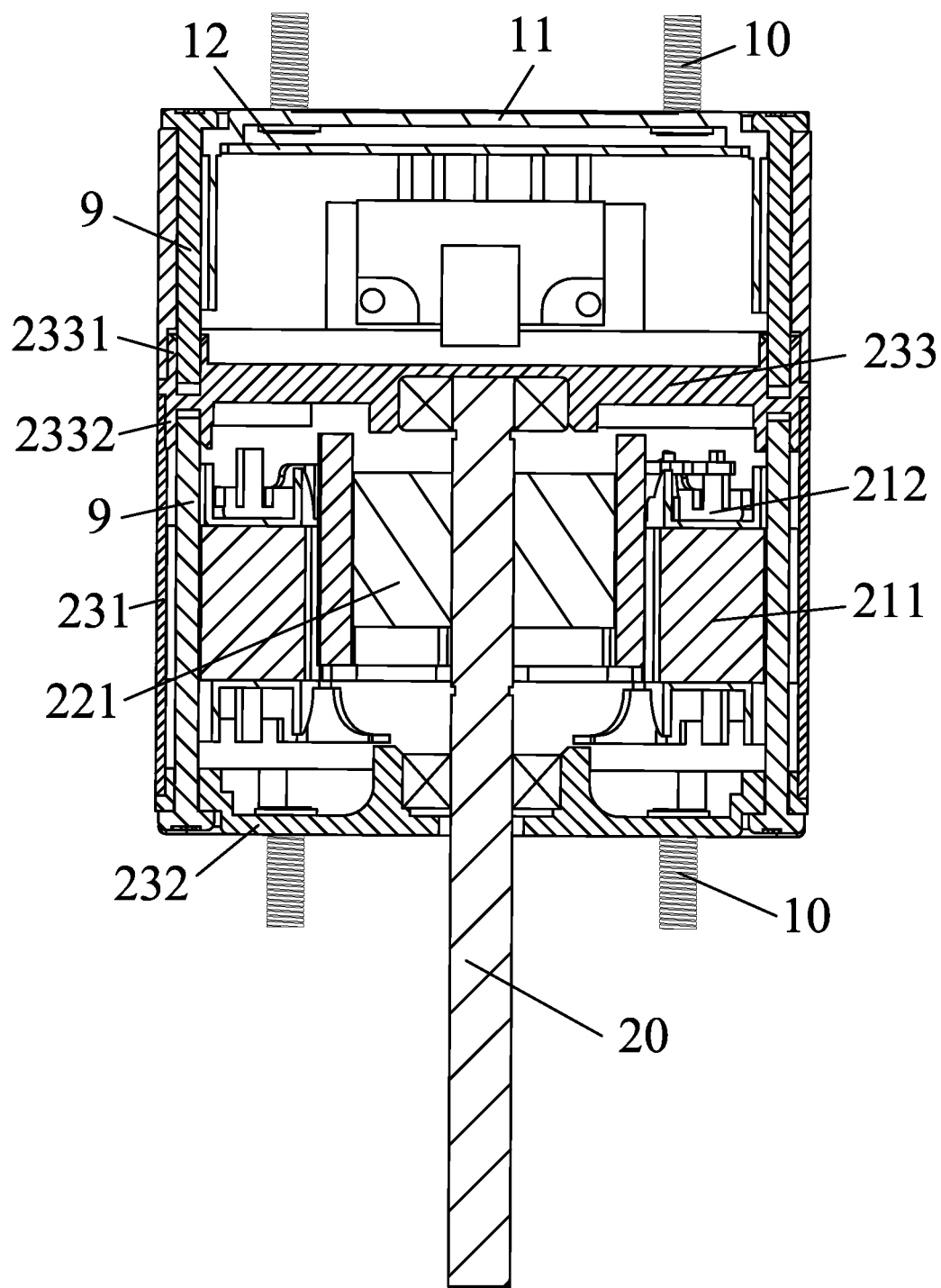
FIG. 3 is a structural sectional view of an ECM motor in accordance with one embodiment of the invention.
Figure 4:
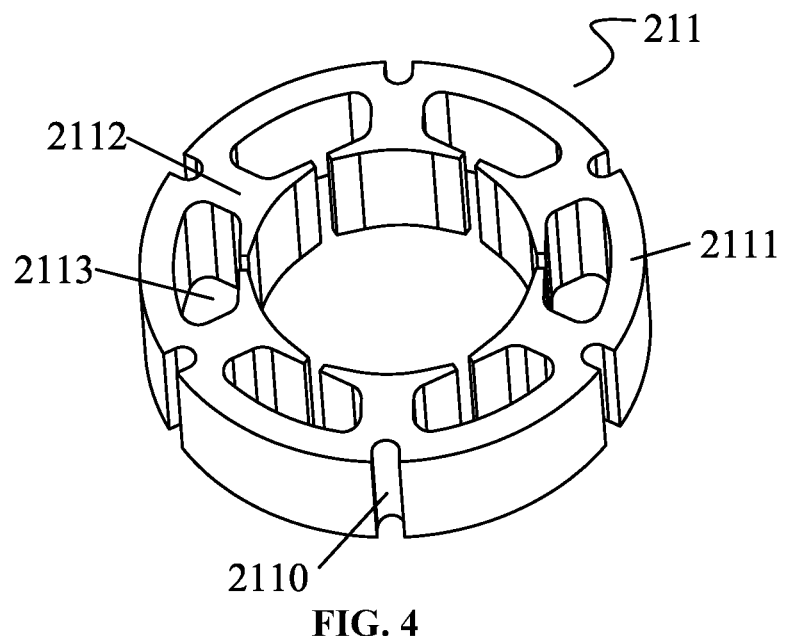
FIG. 4 is a stereogram of a stator core in accordance with one embodiment of the invention.
Figure 5:
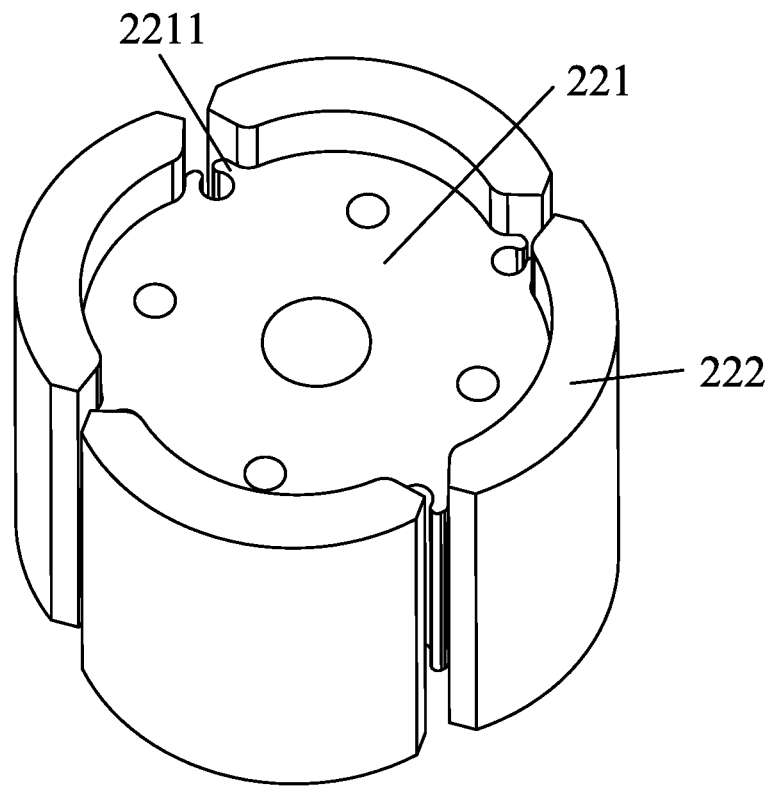
FIG. 5 is a stereogram of a rotor assembly in accordance with one embodiment of the invention.
Figure 6:
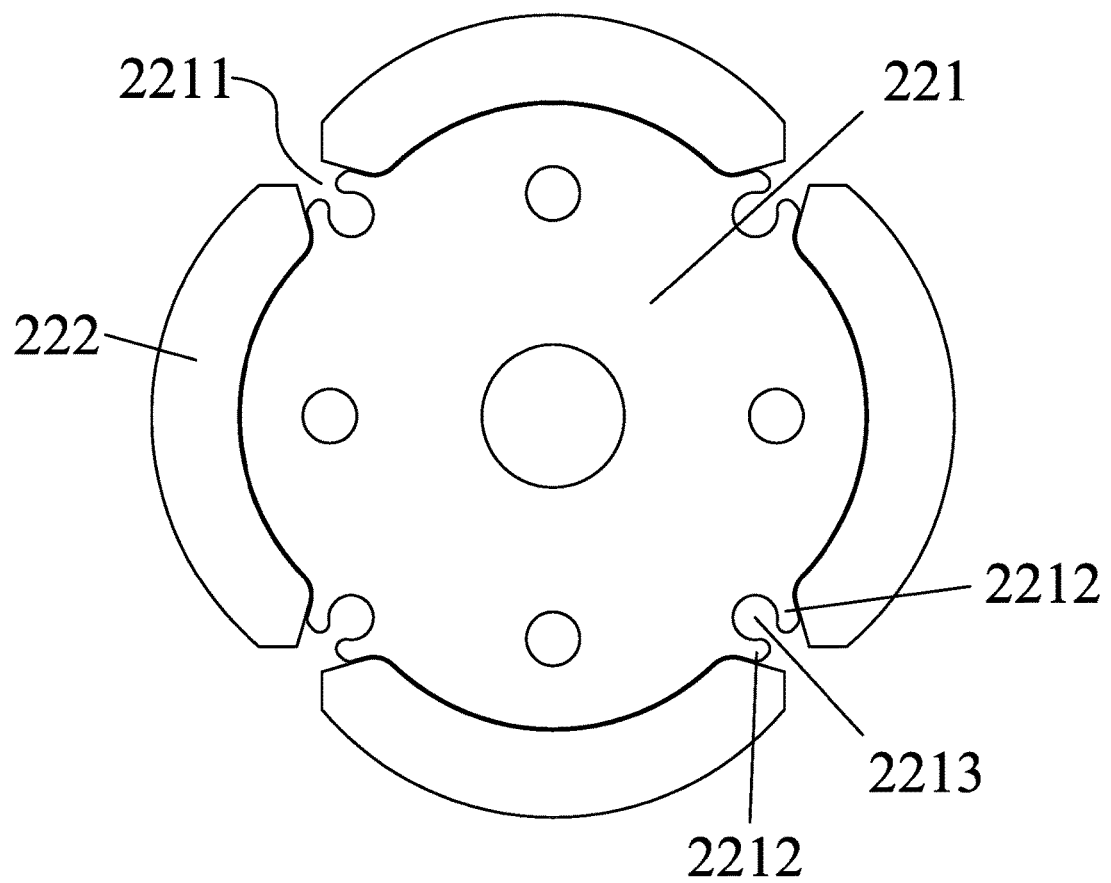
FIG. 6 is a top view of a rotor assembly in accordance with one embodiment of the invention.
Figure 7:
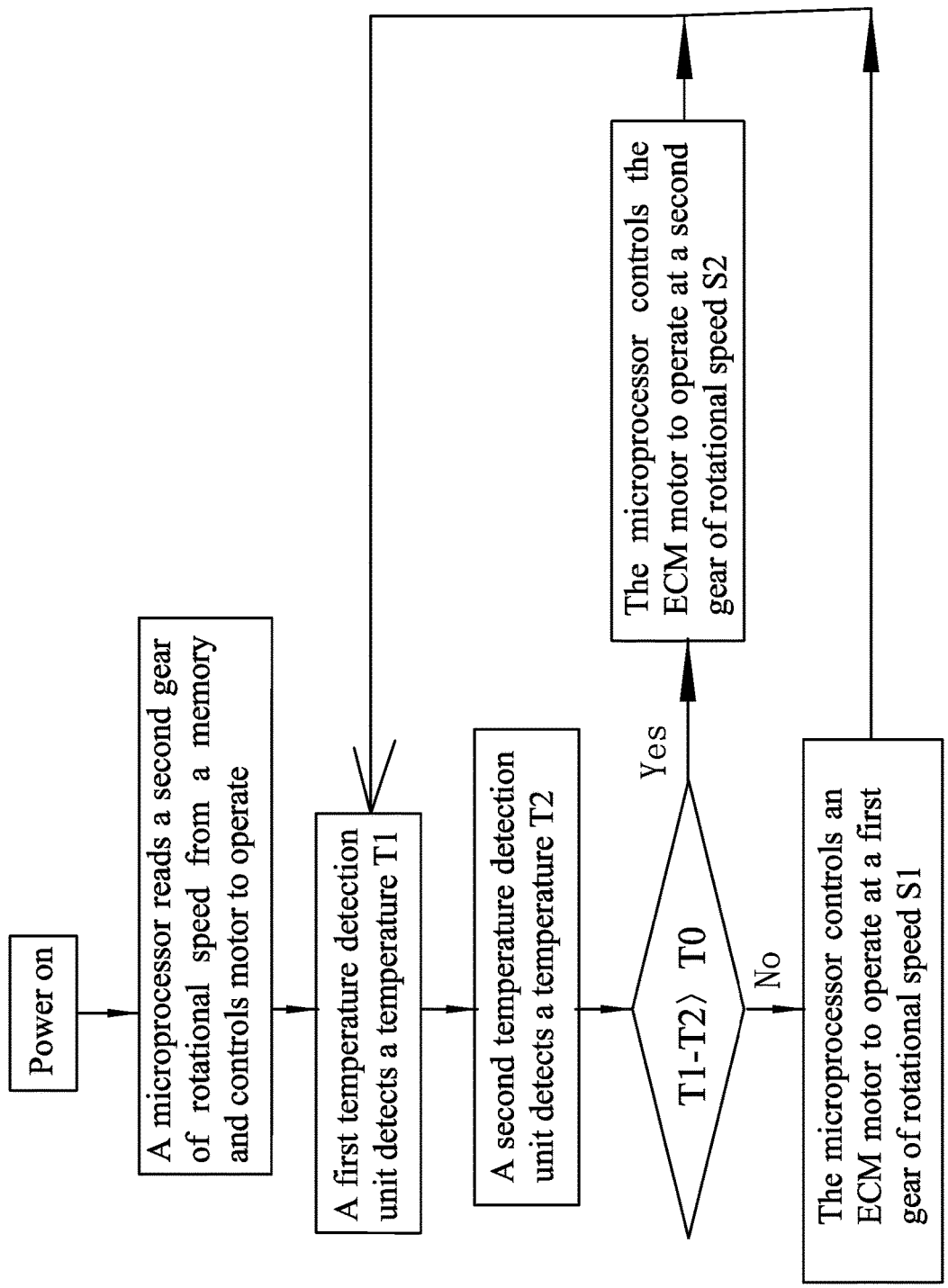
FIG. 7 is a control flow chart of an ECM motor in accordance with one embodiment of the invention.
Figure 8:
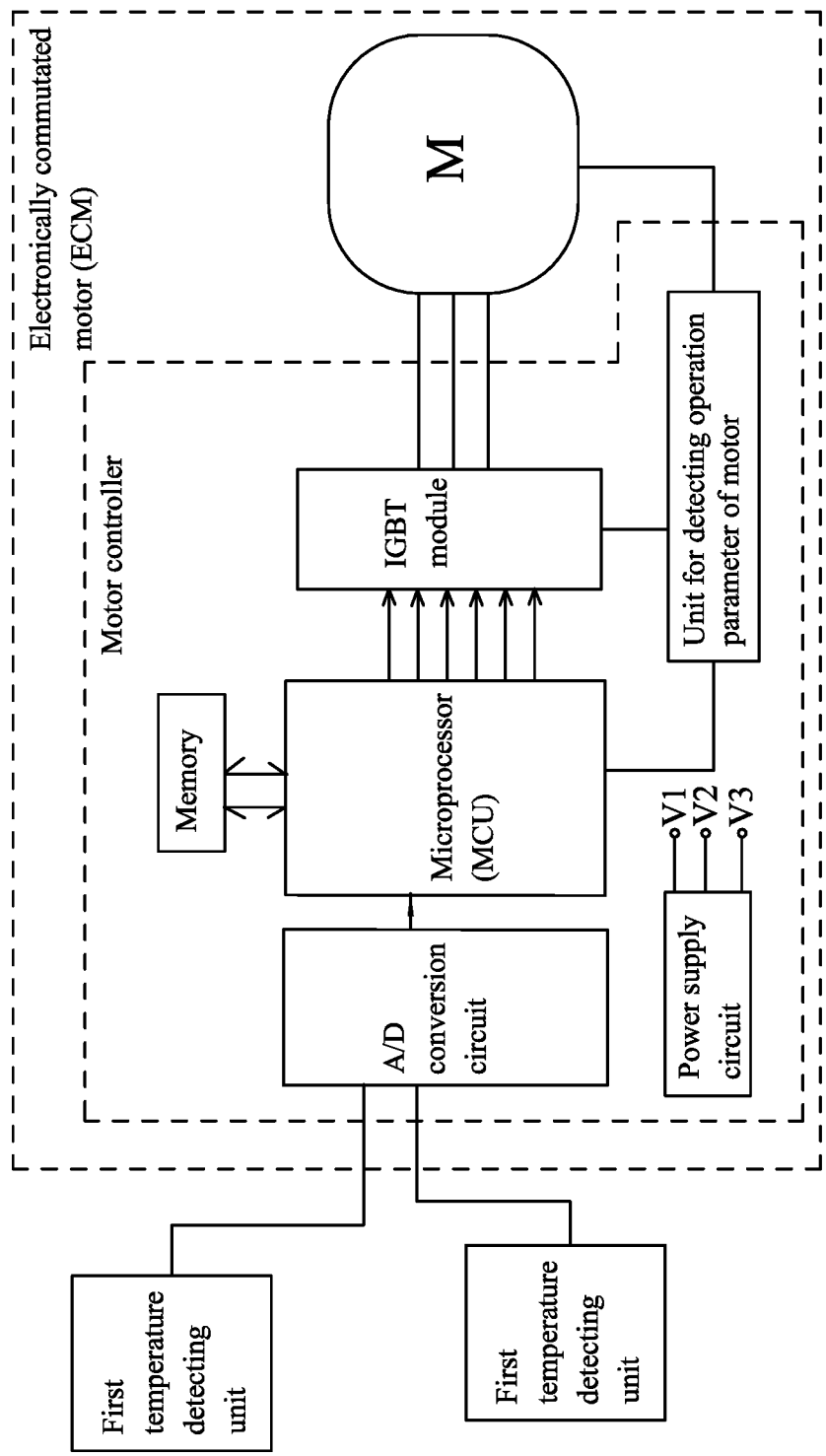
FIG. 8 is a circuit diagram of an ECM motor in accordance with one embodiment of the invention.

As shown in FIGS. 1-8, an ECM motor capable of automatically regulating a rotational speed is illustrated. The ECM motor comprises a motor controller 1 and a motor body 2. The motor body 2 comprises: a rotational shaft 20, a stator assembly 21, a rotor assembly 22, and a housing assembly 23. The housing assembly 23 comprises: a housing 231, a front end cover 232, and a rear end cover 233. The motor controller 1 comprises a control box 11 and a control circuit board 12 installed inside the control box 11. The rotor assembly 22 is installed on the rotational shaft 20, the stator assembly 21 and the housing 231 are connected together and nested outside the rotor assembly 22. The front end cover 232 and the rear end cover 233 are respectively installed at two ends of the housing 231. The rotational shaft 20 is supported by bears of the front end cover 232 and the rear end cover 233. The control box 11 is installed on the rear end cover 233. A plurality of upper bosses 2332 and lower bosses 2332 are protruded from edges of two end faces of the rear end cover 233. Connecting screws 9 are extended from a top of the control box 11 and inserted into upper bosses 2331 so as to install the control box 11 on a top face of the rear end cover 233. Other connecting screws 9 are extended from a top of the front end cover 232 and inserted into the lower bosses 2332 so as to install the front end cover 232 and the rear end cover 233 on two ends of the housing 231. A number of the upper bosses 2331 and a number of the lower bosses 2332 are both two. The upper bosses 2331 and the lower bosses 2332 are symmetrically arranged on the two end faces of the rear end cover 233. A plurality of mounting screws 10 are respectively arranged on the control box 11 and the top of the front end cover 232.

The stator assembly 21 comprises a stator core 211 and coil windings 212 wound on the stator core 211. The stator core 211 comprises a circular yoke 2111 and six teeth 2112 protruded inwards from the circular yoke 2111. Winding slots 2113 are formed between two adjacent teeth 2112. Grooves 2110 are arranged in an axial direction on an outer surface of the circular yoke 2111 and allow the connecting screws 9 to pass through.

The rotor assembly 22 comprises a rotor core 221 and permanent magnets 222 nested in the rotor core 221. Four positioning blocks 2211 are arranged on an outer surface of the rotor core 221 in an axial direction and the four positioning blocks 2211 are alternately distributed on the outer surface of the rotor core 221 in the circumference direction. The permanent magnets 222 are alternately installed on the outer surface of the rotor core 221 and embedded between two adjacent positioning blocks 221. Each positioning block 221 comprises two oppositely arranged projections 2212 and a U-shaped groove formed therebetween.

The motor controller 1 comprises a control circuit board where a microprocessor, an IGBT module, an operation parameter detecting unit, a power supply circuit, and a memory are arranged. The power supply circuit supplies power to other parts of the control circuit board. The operation parameter detecting unit is configured to input operation data of the motor to the microprocessor. An output terminal of the microprocessor is connected to an input terminal of the IGBT module, and an output terminal of the IGBT module is connected to the coil windings 212 wound on the stator core 211. The microprocessor of the motor controller is further connected to a first temperature detecting unit and a second temperature detecting unit. The first temperature detecting unit and the second temperature detecting unit are respectively disposed at different positions outside the ECM motor for detecting a first temperature T1 and a second temperature T2 of different positions. In operation, when a temperature difference between the first temperature T1 and the second temperature T2 is smaller than or equal to a preset value T0, a first gear at the rotational speed S1 is selected by the microprocessor and the motor is controlled to run constantly in the first gear at the rotational speed S1. When the temperature difference between the first temperature T1 and the second temperature T2 is larger than the preset value T0, a second rotational speed S2 is selected by the microprocessor and the motor is controlled to run constantly in the second gear at the rotational speed S2. The preset value T0 is stored in the memory.

Example 2

Figure 9:
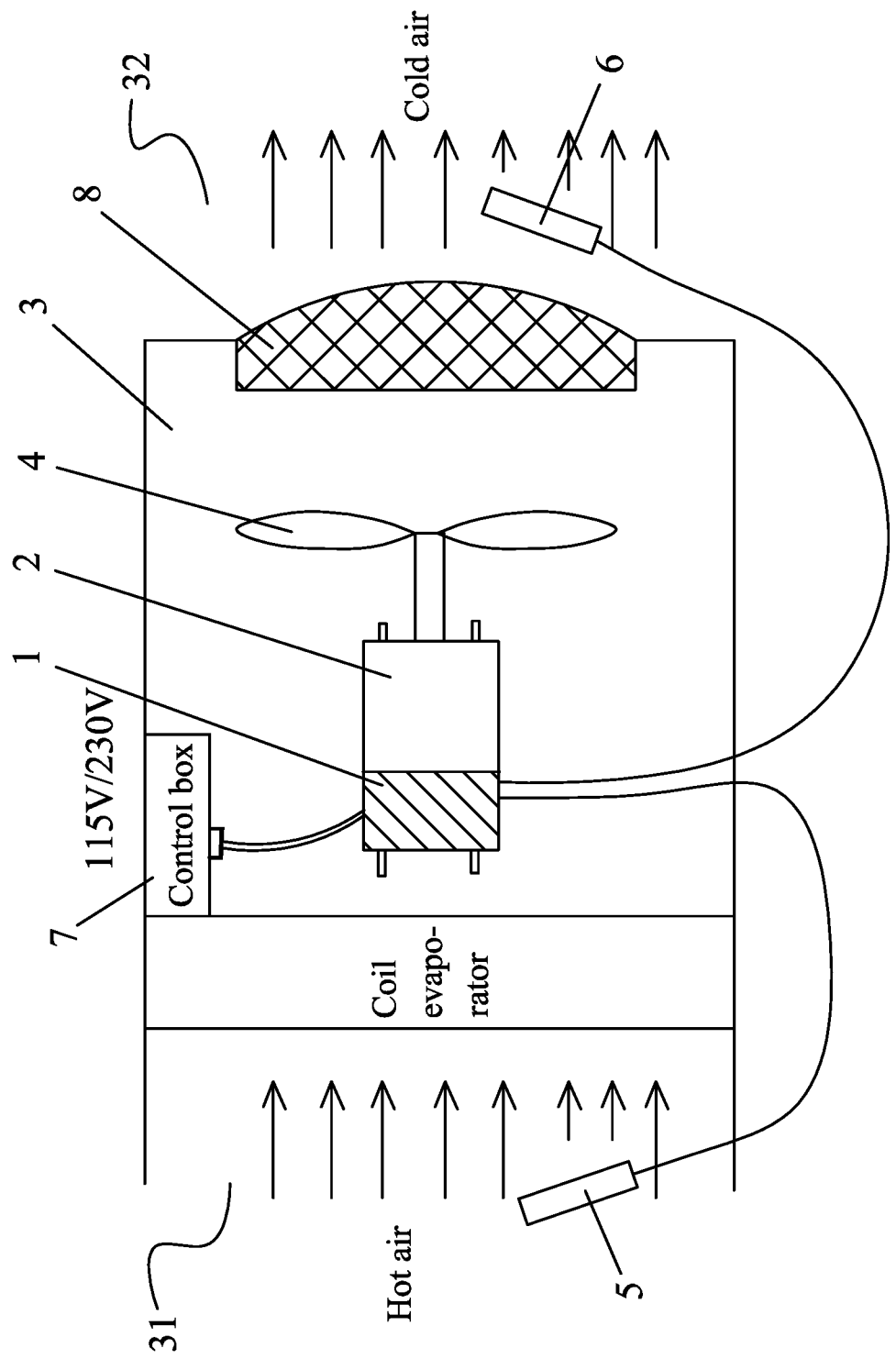
FIG. 9 is a structure diagram of a freezer in accordance with one embodiment of the invention.

As shown in FIGS. 1-9, a freezer comprises: a compressor, a coil evaporator, and an evaporator fan. The evaporator fan comprises: a fan housing 3, an ECM motor, and a plurality of fan blades 4. The compressor supplies a cooling medium to the coil evaporator. The coil evaporator is mounted at one side of the fan housing 3 where an air inlet is arranged. An air outlet 32 is arranged on the other side of the fan housing 3. The ECM motor is disposed inside the fan housing 3. The fan blades 4 are installed on an output shaft of the ECM motor. The ECM motor and the fan blades 4 are disposed between the coil evaporator and the air outlet 32. The ECM motor comprises: a motor controller 1 and a motor body 2. The motor body 2 comprises: a stator assembly 21, a rotor assembly 22, and a housing assembly 23. The stator assembly 21 and the rotor assembly 22 are mounted inside the housing assembly 23. The stator assembly 21 comprises a stator core 211 and coil windings 212 wound on the stator core 211. The rotor assembly 22 comprises a rotor core 221 and permanent magnets 222 embedded in the rotor core 221. The motor controller 1 comprises a control circuit board where a microprocessor, an IGBT module, and an operation parameter detecting unit are arranged. The operation parameter detecting unit inputting operation data of the motor to the microprocessor. An output terminal of the microprocessor is connected to an input terminal of the IGBT module, and an output terminal of the IGBT module is connected to the coil windings 212 wound on the stator core 211. The microprocessor of the motor controller is further connected to a first temperature detecting unit 5 and a second temperature detecting unit 6. The first temperature detecting unit and the second temperature detecting unit are respectively disposed outside the ECM motor. The first temperature detecting unit 5 is disposed in the vicinity of the air inlet 31 of the fan housing 3 for detecting a first temperature T1 of air. The second temperature detecting unit 6 is disposed in the vicinity of the air outlet 32 of the fan housing for detecting a second temperature T2 of the air. In operation, when a temperature difference between the first temperature T1 and the second temperature T2 is smaller than or equal to a preset value T0, a first gear at the rotational speed S1 is selected by the microprocessor and the motor is controlled to run constantly in the first gear at the rotational speed S1. When the temperature difference between the first temperature T1 and the second temperature T2 is larger than the preset value T0, a second rotational speed S2 is selected by the microprocessor and the motor is controlled to run constantly in the second gear at the rotational speed S2. The second gear at the rotational speed S2 is larger than a first gear at the rotational speed S1.

When the ECM motor initially starts under the control of the microprocessor, the motor is controlled to run constantly in the second gear at the rotational speed S2. The first gear at the rotational speed S1 is 800 rpm, and the second gear at the rotational speed S2 is 1550 rpm. The preset value T0 ranges at between 1 and 50° C. A control box 7 is installed in a middle part of the fan housing. The motor controller of the ECM motor is in electric connection with the control box. The first temperature detecting unit and the second temperature detecting unit are both thermocouples. A filter screen 8 is arranged at the air outlet 32 of the fan housing 3, and the second temperature detecting unit 6 is disposed outside the filter screen 8. The control box 7 is input with an alternating current power at a voltage of 115 V or 230 V.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An electrically commutated motor for a fan system, the fan system comprising an evaporation fan comprising a first temperature unit, a second temperature unit, a plurality of fan blades, and a fan housing having an air inlet and an air outlet, wherein the first temperature detecting unit is disposed in the vicinity of the air inlet of the fan housing for detecting a first temperature T1 of the air, and the second temperature detecting unit is disposed in the vicinity of the air outlet of the fan housing for detecting a second temperature T2 of the air; the electrically commutated motor comprising:

A) a motor controller, the motor controller comprising a control circuit board comprising a microprocessor, an insulated gate bipolar transistor module, and an operation parameter detecting unit; and
   B) a motor body, the motor body comprising: a stator assembly, a rotor assembly, and a housing assembly; the stator assembly comprising a stator core and coil windings wound on the stator core; the rotor assembly comprising a rotor core and permanent magnets embedded in the rotor core;

wherein:
      the electrically commutated motor is adapted to be disposed inside the fan housing, and an output shaft of the electrically commutated motor is adapted to support and drive the plurality of fan blades;
      the stator assembly and the rotor assembly are mounted inside the housing assembly; the microprocessor, the insulated gate bipolar transistor module, and the operation parameter detecting unit are arranged on the control circuit board; the operation parameter detecting unit is configured to input operation data of the electrically commutated motor to the microprocessor; an output terminal of the microprocessor is connected to an input terminal of the insulated gate bipolar transistor module, and an output terminal of the insulated gate bipolar transistor module is connected to the coil windings wound on the stator core;

the microprocessor of the motor controller is adapted to be connected to the first temperature detecting unit and the second temperature detecting unit; the electrically commutated motor is adapted to be spatially separated from the first temperature detecting unit and the second temperature detecting unit; and the microprocessor is adapted to determine a rotational speed of the electrically commutated motor based on a difference between the first temperature T1 and the second temperature T2; and in operation, when the difference between the first temperature T1 and the second temperature T2 is smaller than or equal to a preset value T0, a first gear at a rotational speed S1 is selected by the microprocessor and the electrically commutated motor is controlled to run constantly in the first gear at the rotational speed S1; and when the difference between the first temperature T1 and the second temperature T2 is larger than the preset value T0, a second gear at a second rotational speed S2 is selected by the microprocessor and the electrically commutated motor is controlled to run constantly in the second gear at the second rotational speed S2.

2. A freezer, comprising: a compressor, a coil evaporator, and an evaporator fan; the evaporator fan comprising: a fan housing comprising an air inlet and an air outlet, a first temperature unit, a second temperature unit, an electrically commutated motor, and a plurality of fan blades; the electrically commutated motor comprising:

A) a motor controller, the motor controller comprising a control circuit board comprising a microprocessor, an insulated gate bipolar transistor module, and an operation parameter detecting unit; and B) a motor body, the motor body comprising: a stator assembly, a rotor assembly, and a housing assembly; the stator assembly comprising a stator core and coil windings wound on the stator core; the rotor assembly comprising a rotor core and permanent magnets embedded in the rotor core;

wherein:

the compressor supplies a cooling medium to the coil evaporator; the air inlet and the air outlet of the fan housing are respectively disposed at two sides thereof; the coil evaporator is mounted on the fan housing at the side on which the air inlet is arranged;

the electrically commutated motor is disposed inside the fan housing; the fan blades are installed on an output shaft of the electrically commutated motor; and the electrically commutated motor and the fan blades are disposed between the coil evaporator and the air outlet;

the stator assembly and the rotor assembly are mounted inside the housing assembly; the microprocessor, the insulated gate bipolar transistor module, and the operation parameter detecting unit are arranged on the control circuit board; the operation parameter detecting unit is configured to input operation data of the electrically commutated motor to the microprocessor; an output terminal of the microprocessor is connected to an input terminal of the insulated gate bipolar transistor module, and an output terminal of the insulated gate bipolar transistor module is connected to the coil windings wound on the stator core;

the microprocessor of the motor controller is connected to the first temperature detecting unit and the second temperature detecting unit; the first temperature detecting unit and the second temperature detecting unit are disposed outside the electrically commutated motor; the first temperature detecting unit is disposed in the vicinity of the air inlet of the fan housing for detecting a first temperature T1 of the air; the second temperature detecting unit is disposed in the vicinity of the air outlet of the fan housing for detecting a second temperature T2 of the air;

the microprocessor is adapted to determine a rotational speed of the electrically commutated motor based on a difference between the first temperature T1 and the second temperature T2; and in operation, when the difference between the first temperature T1 and the second temperature T2 is smaller than or equal to a preset value T0, a first gear at a rotational speed S1 is selected by the microprocessor and the electrically commutated motor is controlled to run constantly in the first gear at the rotational speed S1; when the difference between the first temperature T1 and the second temperature T2 is larger than the preset value T0, a second gear at a second rotational speed S2 is selected by the microprocessor and the electrically commutated motor is controlled to run constantly in the second gear at the second rotational speed S2; and the second gear at the second rotational speed S2 is larger than the first gear at the first rotational speed S1.

3. The freezer of claim 2, wherein the electrically commutated motor runs constantly in the second gear at the rotational speed S2 in the initial starting state under the control of the microprocessor.

4. The freezer of claim 2, wherein the first gear at the rotational speed S1 is 800 rpm, and the second gear at the rotational speed S2 is 1550 rpm.

5. The freezer of claim 3, wherein the first gear at the rotational speed S1 is 800 rpm, and the second gear at the rotational speed S2 is 1550 rpm.

6. The freezer of claim 2, wherein the preset value T0 ranges at between 1 and 50° C.

7. The freezer of claim 3, wherein the preset value T0 ranges at between 1 and 50° C.

8. The freezer of claim 2, wherein a control box is installed in a middle part of the fan housing; and the motor controller of the electrically commutated motor is in electric connection with the control box.

9. The freezer of claim 3, wherein a control box is installed in a middle part of the fan housing; and the motor controller of the electrically commutated motor is in electric connection with the control box.

10. The freezer of claim 2, wherein the first temperature detecting unit and the second temperature detecting unit are both thermocouples.

11. The freezer of claim 3, wherein the first temperature detecting unit and the second temperature detecting unit are both thermocouples.

12. The freezer of claim 2, wherein a filter screen is arranged at the air outlet of the fan housing, and the second temperature detecting unit is disposed outside the filter screen.

13. The freezer of claim 3, wherein a filter screen is arranged at the air outlet of the fan housing, and the second temperature detecting unit is disposed outside the filter screen.

14. The freezer of claim 8, wherein the control box is input with an alternating current power at a voltage of 115 V or 230 V.

15. The freezer of claim 9, wherein the control box is input with an alternating current power at a voltage of 115 V or 230 V.

* * * * *